3,183,110
NOVEL COATING COMPOSITION
Mary E. Aler and Robert M. Todd, Cincinnati, Ohio, assignors to The Drackett Company, Cincinnati, Ohio, a corporation of Ohio
No Drawing. Filed Oct. 25, 1962, Ser. No. 233,139
4 Claims. (Cl. 106—287)

This invention relates to improved compositions for application to the surfaces of an oven or range to enable easy cleaning. More particularly, the composition comprises a silicone oil, a hydrocarbon solvent diluent dissolved or suspended in a halogenated hydrocarbon propellant. The composition is applied to the designated surface as a fine atomized spray, providing a uniform protective coating highly resistant to heat and which does not detrimentally affect food products which are cooked or baked in the oven or range.

One of the most distasteful chores confronting a housewife is the maintenance of her oven. During normal usage, food products "boil over" or are spilled and spattered within the oven. The heat of the oven causes charring and baking of the spilled products making them extremely difficult to remove. Household soap and detergent solutions have little or no effect when applied with a cloth and/or kitchen brushes. Products have appeared on the market more recently in the form of thixotropic suspensions which are relatively successful insofar as cleaning is concerned. However, such products are strongly caustic in nature requiring application with a long-handled brush or rubber gloves to avoid contact with the skin. After applying the solution, it is necessary to permit the product to stand or soak in order to dissolve the charred materials. Thereafter, it is necessary to rinse the oven to remove the loosened food particles. The operation is burdensome, time-consuming and may cause minute breaks to occur in a porcelain coating, thereby making subsequently spilled food harder to remove.

Accordingly, an effort has been made in the art to provide a means for more easily removing spilled and/or spattered food particles from an oven. One method suggested is the treating of the oven surface at its point of manufacture, or the treatment of disposable oven liners with a thermosetting silicone resin. Such resins are highly resistant to heat deterioration and when applied to ovens or oven liners permit easy removal of spattered food particles by application of common household detergents. It is apparent, however, that such coatings eventually are removed, exposing the underlying porous enamel or ceramic coverings. After removal of the silicone coatings, the oven surfaces are again hard to maintain.

Therefore, it is an object of the instant invention to provide a coating composition which can be easily applied to an oven surface as a uniform coating by the housewife, and maintain continuity of oven or range surfaces.

It is another object of the instant invention to provide a coating composition for application to an oven which permits easy cleaning but does not adversely affect food products baked therein.

It is another object of the instant invention to provide a composition for application to oven surfaces which does not char or discolor upon being exposed to high temperatures.

It is another object of the instant invention to provide a composition for application to an oven surface which does not produce a disagreeable odor at high temperatures.

These and other objects of the instant invention will become more fully apparent from the following detailed description and preferred embodiment.

The above objects are accomplished by packaging a dimethylpolysiloxane having a viscosity within the range of from about 20,000–50,000 centistokes, a hydrocarbon solvent, and a halogenated alkane propellant in a pressure container. The dimethylpolysiloxane oil is employed within the range of from about 2–7.5% of the total composition, the hydrocarbon diluent being from about 0.5–4.5% and the remainder being propellant. The packaged composition will possess an internal pressure of from about 21–28 p.s.i.g. at 70° F.

The composition is applied to a stove or oven surface by actuating a valved nozzle, producing a fine atomized mist. The hydrocarbon in the composition carries the silicone oil after the propellant is volatilized, laying down a smooth, continuous film. The hydrocarbon diluent evaporates from the silicone film providing a surface that resists adherence of foreign particles, permitting their easy removal with a wet cloth or detergent solution, but which is not altered by the high heat of an oven. Since the film is not thermosetting, it is necessary to apply additional coatings after repeated cleanings.

The nature of the silicone oil, its viscosity, the concentration of the oil, the hydrocarbon diluent and the propellant are extremely critical. Thus, if the silicone oil has a viscosity above about 50,000 centistokes, the resultant film is waxy in appearance and will not provide a uniform or continuous coating. Silicone oils having a viscosity of less than about 20,000 centistokes, on the other hand, when heated in air above about 400° F. tend to break down into smaller molecular fragments which volatilize, particularly in the presence of a catalyst. A number of catalytic agents for the thermal degradation, such as acids, bases and sulfurous components are present in the atmosphere. The volatilized components adversely affect food products prepared in the oven.

Silicone resins which are thermosetting upon the application of heat are not permissive for use in that the resin particles are not easily applied from a pressurized container, do not cure under normal conditions to a surface that resists food sticking to it and, additionally, are substantially impossible to remove completely. However, they are sufficiently susceptible to cleaning solutions normally applied to an oven surface by a housewife, as well as to degradation by heat, to become partially removed, destroying the continuity of the protective coating. Additionally, certain materials, particularly grease, can be removed only with difficulty usually leaving a dull, smeary, unsightly surface.

Dimethylpolysiloxane oils having a viscosity of from about 20,000–50,000 centistokes, on the other hand, provide a surface which is very shiny and pleasant in appearance. The oils are highly resistant to thermal degradation but yet are removed with household detergents along with the foreign residues, or by continuous heating of the surface. After the housewife cleans the surface of her oven, a thin protective coating is easily re-applied. The film will stay intact until the next cleaning by the housewife. Thus, in contradistinction to silicone resins which are substantially permanent, the instant composition provides a relatively temporary film which is removable, permitting re-application. As is apparent, no build-up of the film occurs.

An additional advantage of dimethylpolysiloxane flows from their resistance to thermal degradation. Many silicone oils and resins are thermally unstable and detrimentally affect baked goods. The reaction mechanism is not completely clear, however, it is theorized that the lower molecular weight silicone fragments have an antifoaming type action upon certain baked goods, destroying the raising tendency necessary in baked products. Credibility to this assumption is strengthened in view of knowledge that silicone oils are extensively employed as anti-foaming agents.

The concentrates of the dimethylpolysiloxane must be within the range of from about 2–7.5%. Concentrates in excess of about 7.5% provide a protective coating which is greasy to the feel and difficult to remove. Concentrates of less than about 2% do not afford adequate protection to the surface of the oven. Although it may be possible to provide sufficient protection by applying more than one coating of a composition possessing less than 2% silicone oil, the repeated application is time-consuming on the part of the housewife, leading to possible misuse of the product, and defeats, to some extent, the advantageous features of the instant invention.

In the present invention the protection of the range or oven surface is provided by a thin film of stable silicone oil. However, it has been discovered that if a silicone oil is employed which permits an even spread of the silicone film, the silicone oil is thermally unstable. However, if a silicone oil which is highly thermally resistant is employed, the viscosity is such that a uniform film cannot be obtained. Thus, it has been found essential to employ a diluent in the pressurized compositions. However, the diluent must be sufficiently volatile so that it evaporates from the contacted surface within a reasonably short time, providing a thin uniform polysiloxane film. Additionally, the solvent must be substantially non-toxic, and of low solvency to prevent attack on surfaces on which it contacts.

Diluents which have been found operable are the lower molecular weight hydrocarbons having a boiling point within the range of 119 to 207° C. or mixtures thereof. Isopar H, which is a narrow boiling range of isoparaffins, having a boiling point within the range of 176° C. and 188° C., is particularly operable. Other diluents include VM and P Naphtha, Stoddard solvent, mineral spirits and chlorothene. The aromatic hydrocarbons are to be avoided as much as possible due to their toxic nature. The hydrocarbon should be present within the range of from about 40% to 60% of the amount of dimethylpolysiloxane. If less than the aforementioned diluent is employed, the silicone oil will have a viscosity which is too high to permit the application of a uniform film. However, on the other hand, if the silicone oil is diluted too much with solvents, a film sufficiently heavy to provide protection of the treated surface will not be obtained, or upon evaporation of the solvent, a spotty or discontinuous covering will be obtained. Thus, to cover the surface entirely would require several coatings or wiping by hand.

The propellant or liquefied gas which is employed to dissolve or suspend the dimethylpolysiloxane oil and hydrocarbon diluent should have a vapor pressure at 70° F. exceeding about 20 p.s.i.g., but not exceeding 28 p.s.i.g. Vapor pressures within the aforementioned range are sufficient to expel the contents from the container and provide a mist having a particle size which assures the application of a thin, uniform coating. However, the vapor pressure is not so high as to cause the composition to blow back out of the oven space, wasting the product. Furthermore, if the composition settles on the floor, the surface becomes extremely slick, providing obvious inherent dangers. The propellant must be non-toxic and have a high flash point. Since the product is employed around open flames and pilot lights, it must be non-flammable. Additionally, the propellant should not have too low a boiling point at atmospheric pressure in order to facilitate packaging of the silicone oil and propellant mixture. Operable propellants are the halogenated alkanes such as dichloro-difluoromethane, difluoro-chloromethane, trichloro-fluoromethane, trifluoro-chloromethane, tetrafluoromethane, dichloro-fluoromethane, trichloro-trifluoroethane, dichloro-tetrafluoroethane, 1,1-dichloro, 2,2-difluoroethane and 1,1,1-difluoro-chloroethane. Methylene chloride can be used as a diluent, however, it is not preferred since it may attack some surfaces.

Hydrocarbon propellants are inoperable due to their flammable nature. Since the product may be used near lighted pilot lights, it cannot flash or burn. Propellants such as carbon dioxide, nitrous oxide and nitrogen will not provide the required vapor pressures. If a composition employing nitrous oxide, carbon dioxide or nitrogen is diluted sufficiently to reduce the vapor pressure within the prescribed range of about 20–28 p.s.i.g. by employment of a solvent, the resultant composition is unsatisfactory due to odor, toxicity, flammability, increased drying time and poor surface coverage.

As is apparent, therefore, the limits of the instant composition are critical. The protective covering must be a dimethylpolysiloxane oil. Other silicone oils and silicone resins do not provide the requisite properties of resistance to thermal degradation as well as spreadability and removability. No other material known behaves in quite the same way as dimethylpolysiloxane. Thus, the designated silicone oil is non-reactive with foods, is not soluble in oils and greases and is resistant to thermal degradation. Hydrocarbon oils and waxes, on the other hand, when heated, become better solvents for foods, char at low temperatures, provide no lasting protection and generally give an unsightly residue when heated for prolonged periods. The fluorocarbons and fluorocarbon resins provide some of the requisite properties of the silicone oil, however, they are thermally unstable, producing volatile by-products which are corrosive in nature and which detrimentally affect food production prohibiting their use as oven protectants.

Having described the instant invention in general terms, a typical preferred embodiment of the invention is as follows:

Example

A 7% solution of Union Carbide silicone oil L–45 and 3.5% naphtha, a mixture of aliphatic hydrocarbons having a boiling point range of from 176° C. to 188° C., in 60% trichlorofluoromethane and 29.5% difluoro-dichloromethane propellants is enclosed in a pressure container having a valved nozzle. Union Carbide silicone oil L–45 is a dimethylpolysiloxane which has a specific gravity at 25° C./25° C. of 0.973, a flash point of more than 600° F., a pour point of −47° F., a viscosity of 30,000 centistokes and which is thermally stable at a temperature of at least about 300° F. in air and 400° F. in an inert atmosphere. Upon activation of the valve, a burst of propellant and silicone oil dissolved in hydrocarbon diluent, which results in a fine flowing mist is expelled. The propellant evaporates almost immediately after leaving the vessel. However, the hydrocarbon diluent evaporates after contacting the surface to be coated providing an exceedingly thin uniform film of dimethylpolysiloxane oil. The film is highly resistant to thermal degradation. Food particles which contact the coated surface are easily removed by wiping with a wet cloth, eliminating the burdensome task usually confronting the housewife in cleaning her oven. Inasmuch as the product is a true aerosol, a very thin continuous coating is applied, conserving the product. Furthermore, since the product is expelled as a fine atomized mist, it is not completely necessary to employ directional spraying. The entire surface of the oven can be coated with a continuous film by merely opening the oven door and actuating the valve of the aerosol package. As is apparent, this avoids bending on the part of the user and eliminates the need for careful spraying in a pattern to ensure complete coverage.

The present invention as hereinbefore described and illustrated in the example accomplishes all of the objects of the invention as set forth. While there has been description and illustration of only a preferred embodiment, it is obvious that numerous omissions and alterations may be made without departing from the scope and spirit of the invention.

That which is claimed is:

1. An improved oven protectant formulation consisting essentially of from about 2 to 7.5% dimethylpolysiloxane having a viscosity of from about 20,000 to 50,000 centistokes, about 0.5 to 4.5% hydrocarbon solvent having a boiling point range of from about 119° C. to 207° C., and the remainder of the formulation being a halogenated alkane gas.

2. The improved formulation of claim 1 wherein the dimethylpolysiloxane has a viscosity of from 28,000 to 35,000 centistokes.

3. The improved formulation of claim 2 wherein the hydrocarbon diluent is an aliphatic naphtha having a boiling point range of 175° C. to 188° C.

4. An oven protectant formulation packaged in a suitable pressure container having a dispensing valve which consists essentially of from about 2 to 7.5% dimethylpolysiloxane having a viscosity of from about 20,000 to 50,000 centistokes, about 0.5% to 4.5% hydrocarbon solvent having a boiling point range of from about 119° C. to 207° C., and the remainder of the formulation being liquefied halogenated alkane gas, said package composition having an internal pressure of from about 21 to 28 p.s.i.g. at 70° F.

References Cited by the Examiner

UNITED STATES PATENTS

| | | | |
|---|---|---|---|
| 2,462,242 | 2/49 | Webb et al. | 106—287 |
| 2,672,105 | 3/54 | Clark et al. | 106—287 |

OTHER REFERENCES

Du Pont: "Freon-Aerosol Report," FA-22, page 1, 1957.

MORRIS LIEBMAN, *Primary Examiner.*